(12) United States Patent
Rosnell et al.

(10) Patent No.: US 11,331,637 B2
(45) Date of Patent: May 17, 2022

(54) ARRANGEMENT FOR AND A METHOD OF CONTROLLING FLOW OF SOLID PARTICLES AND A FLUIDIZED BED REACTOR

(71) Applicant: SUMITOMO SHI FW ENERGIA OY, Espoo (FI)

(72) Inventors: Teemu Rosnell, Honkajoki (FI); Ari Kettunen, Leppävirta (FI)

(73) Assignee: Sumitomo SHI FW Energia OY, Espoo (FI)

( * ) Notice: Subject to any disclaimer, the term of this patent is extended or adjusted under 35 U.S.C. 154(b) by 0 days.

(21) Appl. No.: 17/269,702

(22) PCT Filed: Aug. 24, 2018

(86) PCT No.: PCT/FI2018/050603
§ 371 (c)(1),
(2) Date: Feb. 19, 2021

(87) PCT Pub. No.: WO2020/039117
PCT Pub. Date: Feb. 27, 2020

(65) Prior Publication Data
US 2021/0316264 A1   Oct. 14, 2021

(51) Int. Cl.
*B01J 8/00* (2006.01)
*B01J 4/00* (2006.01)
(Continued)

(52) U.S. Cl.
CPC ............... *B01J 4/005* (2013.01); *B01J 8/003* (2013.01); *B01J 8/1809* (2013.01);
(Continued)

(58) Field of Classification Search
CPC ........ B01J 8/0015; B01J 8/003; B01J 8/0025; B01J 8/1809; B01J 8/1818
See application file for complete search history.

(56) References Cited

U.S. PATENT DOCUMENTS

| 4,312,301 A | 1/1982 | Anson |
| 4,457,289 A | 7/1984 | Korenberg |

(Continued)

FOREIGN PATENT DOCUMENTS

| CN | 102901093 A | 1/2013 |
| EP | 0 682 761 B1 | 2/1998 |

(Continued)

OTHER PUBLICATIONS

Notification of and International Search Report and Written Opinion dated Mar. 28, 2019, in corresponding International Patent Application No. PCT/FI2018/050603.

(Continued)

*Primary Examiner* — Lessanework Seifu
(74) *Attorney, Agent, or Firm* — Venable LLP

(57) ABSTRACT

An arrangement for controlling a flow of solid particles includes a vertical inlet pipe for directing solid particles downwards and having a bottom at a level L0, a first outlet chute and a second outlet chute in particle flow connection with the vertical inlet pipe and a fluidizing device for directing controlled first and second sub flows to the first and second outlet chutes. The arrangement includes a branch in particle flow connection with an opening on a side wall of the vertical inlet pipe for directing the first sub flow of solid particles to the first outlet chute and a horizontally extending intermediate pipe for directing the second sub flow of solid particles to the second outlet chute. The intermediate pipe includes at least one nozzle feeding fluidizing gas to the intermediate pipe and has a first end in particle flow connection with the bottom of the inlet pipe.

16 Claims, 6 Drawing Sheets

(51) Int. Cl.
  *B01J 8/18* (2006.01)
  *F22B 31/00* (2006.01)
  *F23C 10/26* (2006.01)

(52) U.S. Cl.
  CPC .......... *F22B 31/0084* (2013.01); *F23C 10/26* (2013.01); *B01J 2208/00548* (2013.01); *B01J 2208/00752* (2013.01); *B01J 2208/00761* (2013.01)

(56) References Cited

U.S. PATENT DOCUMENTS

| | | |
|---|---|---|
| 4,473,032 A | 9/1984 | Maintok |
| 4,552,203 A | 11/1985 | Chrysostome et al. |
| 4,672,918 A | 6/1987 | Engstrom et al. |
| 4,733,621 A | 3/1988 | Kostamo et al. |
| 5,140,950 A | 8/1992 | Abdulally |
| 5,343,830 A | 9/1994 | Alexander et al. |
| 5,442,919 A | 8/1995 | Wilhem |
| 5,570,645 A | 11/1996 | Garcia-Mallol |
| 5,642,676 A | 7/1997 | Schaker et al. |
| 6,264,465 B1 | 7/2001 | Ishida |
| 7,543,553 B2 | 6/2009 | Watanabe |

FOREIGN PATENT DOCUMENTS

| | | |
|---|---|---|
| EP | 2 179 218 A | 10/2016 |
| EP | 2179218 B1 | 10/2016 |
| KR | 2002003187 A | 5/2002 |
| KR | 20020031687 A | 5/2002 |
| KR | 20170031407 A | 3/2017 |
| RU | 2532275 C1 | 11/2014 |
| WO | 00/42295 A1 | 7/2000 |
| WO | 004295 | 7/2000 |

OTHER PUBLICATIONS

Notification of and International Preliminary Reporton Patentability dated Dec. 17, 2020, in corresponding International Patent Application No. PCT/FI2018/050603.
Examination Report No. 1 for Standard Patent Application, dated Nov. 19, 2021, in Australian application No. 2018438149 (3 pages).
Russian Office Action, dated Dec. 15, 2021, in Russian application No. 2021107112 (2 pages).

ARRANGEMENT FOR AND A METHOD OF CONTROLLING FLOW OF SOLID PARTICLES AND A FLUIDIZED BED REACTOR

CLAIM OF PRIORITY

This application is a U.S. national stage application of International Patent Application No. PCT/FI2018/050603, filed Aug. 24, 2018, now published as International Publication No. WO 2020/039117 A1 on Feb. 27, 2020.

BACKGROUND OF THE INVENTION

Field of the Invention

The present invention relates to an arrangement for and a method of controlling flow of solid particles. More particularly, the invention relates to leading controlled first and second sub flows, formed in a flow controlling arrangement from an initial flow of solid particles flowing downwards in a vertical inlet pipe, to first and second outlet chutes. The invention also relates to a fluidized bed reactor with an arrangement for forming controlled sub flows from an initial flow of solid particles

Description of Related Art

When operating fluidized bed reactors, such as circulating fluidized bed boilers, there is often a need into control flow of solid particles, especially, the division of an initial flow of solid particles to two or more sub flows. Especially, when returning solid particles separated from exhaust gas emanating from the fluidized bed reactor, there is often a need to lead a controlled portion of the separated particles via a heat exchanger, as cooled particles, back to the reactor, whereas another portion of the separated particles is returned uncooled directly to the reactor. U.S. Pat. Nos. 4,312,301, 4,552,203, 4,672,918, 4,473,032, 5,570,645, 5,642,676, 6,264,465 B1, 5,442,919, European patent EP 2 179 218 B1, Korean patent document KR 2017-0031407, and U.S. Pat. No. 7,543,553 B2 show prior art solutions in which a mechanical flow control device, such as a plug valve, throttle valve, or a rotary lock is used to control the ratio of two sub flows formed from an initial flow of solid particles. However, such mechanical flow control devices are often quite complicated structures and may have a tendency to get stuck caused by solid particles entering between moving parts of the device.

Another conventional way to control solid particle flows in a fluidized bed reactor is to utilize a particle chamber with separately fluidized areas to enable or to prevent flow of particles to certain paths, as needed. European Patent EP 0 682 761 B1 teaches using separately fluidized areas in a chamber to direct solid particles to different paths towards outlet openings in a heat exchange chamber. This structure, however, does not allow definite independent control of the formed sub flows. U.S. Pat. No. 5,140,950 discloses independently fluidized areas in a heat exchanger divided by division walls. Such a construction improves independent control of the sub flows, but makes the structure more complicated and may cause stagnation of particles to corner areas of the chamber. Moreover, the structures of EP 0 682 761 B1 and U.S. Pat. No. 5,140,950 do not allow independent control of the particle flows and heat exchange efficiency in the heat transfer surfaces.

U.S. Pat. No. 4,457,289 shows, in FIG. 6, a fluidized bed reactor comprising a particle separator for separating solid particles from exhaust gas emanating from the reactor and a return duct system for returning separated particles from the particle separator back to the reactor. The return duct system comprises a gas seal with a non-mechanical flow controlling arrangement comprising a fluidized bed with outlets at two opposite ends thereof so as to divide the initial flow of particles to two sub flows. The first sub flow is returned over a weir directly back to the reactor and the second sub flow is returned over another weir to a heat exchange chamber, from where the second flow can be returned back to the reactor. A problem in the dividing gas seal shown in U.S. Pat. No. 4,457,289 is that the controllability of the ratio of the two sub flows is relatively weak. Patent document KR 2002-0031687 appears to show a downwards slanted outlet chute directly connected to a side wall of the lower portion of a vertical inlet duct of a seal pot.

U.S. Pat. No. 4,733,621 relates to a different problem, a need to enable even distribution of particles returned from a particle separator to the reactor. U.S. Pat. No. 4,733,621 teaches arranging a horizontal distribution pipe symmetrically at the lower end of a vertical inlet pipe. The horizontal distribution pipe comprises multiple separately fluidized sections, vertical riser pipes at the ends of the horizontal intermediate pipe, and inclined outlet chutes to the reactor at the upper end of the riser pipes. In this construction, a relatively long horizontal pipe is needed to enable independent control of the sub flows through the vertical riser pipes.

Chinese Patent No. 102901093A teaches arranging a division wall at the central portion of a vertical inlet pipe to improve independent controllability of the ratio of two sub flows to two outlet chutes via riser pipes at the ends of a relatively short the horizontal intermediate pipe. A problem with this structure is that a non-even distribution of the initial flow of particles in the vertical inlet pipe may prevent obtaining desired distribution of the sub flows in the outlet chutes.

An object of the present invention is to provide an advantageous arrangement for and a method of controlling flow of solid particles in which the problems of the prior art are avoided or minimized.

SUMMARY OF THE INVENTION

According to one aspect, the present invention provides an arrangement for controlling a flow of solid particles, the arrangement comprising a vertical inlet pipe for directing the flow of solid particles downwards therein and having a bottom at a level L0, a first outlet chute and a second outlet chute in particle flow connection with the vertical inlet pipe and a fluidizing device for directing controlled first and second sub flows formed from the flow of solid particles to the first and second outlet chutes, respectively, wherein the arrangement comprises a branch in particle flow connection with an opening on a side wall of the vertical inlet pipe for directing the first sub flow of solid particles to the first outlet chute, wherein the opening has a lower edge at a level L1 that is higher than L0, and a horizontally extending intermediate pipe for directing the second sub flow of solid particles to the second outlet chute, the horizontally extending intermediate pipe comprising at least one nozzle for feeding fluidizing gas to the horizontally extending intermediate pipe and having a first end in particle flow connection with the bottom of the vertical inlet pipe at the level L0.

The arrangement also advantageously comprises a vertically extending riser pipe with a bottom end in particle flow connection with a second end of the horizontally extending intermediate pipe. An upper end of the vertically extending riser pipe is then in particle flow connection with the second outlet chute at a level L2 that is higher than L1.

According to another aspect, the present invention provides a method of controlling a flow of solid particles, comprising directing the initial flow of solid particles downwards in a vertical inlet pipe having a bottom at a level L0, forming controlled first and second sub flows of solid particles from the initial flow of solid particles and leading the first and second sub flows to first and second outlet chutes, respectively, wherein the method comprises forming a fluidized bed of solid particles from the initial flow of solid particles to a horizontally extending intermediate pipe extending from the bottom of the vertical inlet pipe at the level L0 to a bottom end of a vertically extending riser pipe, leading the first controlled sub flow to the first outlet chute via a branch from an opening on a side wall of the vertical inlet pipe at a level L1 that is higher than L0, and leading the second controlled sub flow from an upper end of the vertical riser pipe to the second outlet chute at a level L2 that is higher than L1.

According to the present invention, the downwardly directed first and second outlet chutes are non-symmetrically connected to the vertical inlet pipe so that the second outlet chute advantageously begins at a higher level than does the first outlet chute. By the beginning of an outlet chute is herein meant the level at which the corresponding flow path of the solid particles is finally turned downwards, for example, from a vertically extending riser pipe. According to a main feature of the present invention, the particle flow path to first outlet chute branches from the vertical inlet pipe at a level L1 that is clearly higher than the level of the bottom L0 of the vertical inlet pipe, whereas the particle flow path to the second outlet chute passes via the bottom of the vertical inlet pipe.

The first outlet chute is advantageously connected to the vertical inlet pipe via a branch arranged at the level L1 to an opening on a side wall of the vertical inlet pipe. More precisely, the opening has a lower edge at the level L1 and an upper edge at a level L4. According to a preferred embodiment of the present invention, the branch comprises a horizontally extending portion with fluidizing nozzles leading to a weir over which solid particles must flow to enter to the first outlet chute. The weir advantageously extends to a level L3 that is higher than the level L4 of the upper edge of the opening, so as to collect a gas lock forming fluidized bed of particles in the branch. The branch may advantageously comprise a horizontally extending shift pipe from the opening to an intermediate riser pipe, wherein a portion of a side wall of the intermediate riser pipe forms the weir.

According to another embodiment of the present invention, the first outlet chute is directly connected to an opening, having a lower edge at the level L1, on a side wall of the vertical inlet pipe. Thereby, particles can fall or drop from the vertical inlet pipe directly to the first outlet chute. During normal operation a bed of particles extending up to the level L1 is formed to the bottom of the vertical inlet pipe, and additional solid particles flow freely from the vertical inlet pipe to the first outlet chute. Thus, when solid particles are entering through the vertical inlet pipe to the flow controlling arrangement, the particles primarily flow to the first outlet chute. In this embodiment, the particle flow path to the first outlet chute does not form a gas lock. The embodiment is, therefore, only usable in applications in which a gas lock is not needed or a gas lock is provided in another part of the particle flow path, for example, in a heat exchange chamber downstream of the flow controlling arrangement.

Even when the first outlet chute is directly connected to the vertical inlet pipe, the flow path towards the second outlet chute advantageously comprises a horizontally extending intermediate pipe having a first end attached in particle flow connection with the bottom of the vertical inlet pipe at the level L0 and a second end attached in particle flow connection with a bottom end of a vertically extending riser pipe. During the operation of the system, a gas lock forming bed of particles is collected to the horizontally extending intermediate pipe and to the vertically extending riser pipe. The gas lock then prevents gas from flowing backwards to the vertical inlet pipe.

The horizontally extending intermediate pipe advantageously comprises at least one nozzle for feeding fluidizing gas. According to advantageous embodiments of the present invention, one or more fluidizing nozzles are arranged at one or more of the second end of the horizontally extending intermediate pipe, between the first end and the second end of the horizontally extending intermediate pipe, and the first end of the horizontally extending intermediate pipe. According to a preferred embodiment of the present invention, also, the vertically extending riser pipe comprises at least one nozzle for feeding fluidizing gas at a level between levels L0 and L2. When it is desired that a portion of the initial flow of solid particles flows through the second outlet chute, fluidizing gas is advantageously fed at a suitable velocity to the horizontal intermediate pipe and/or to the vertical riser pipe. Thereby, when a high enough fluidizing velocity is used, an upper level of the fluidized bed in the vertical riser pipe reaches the level L2 of the second outlet chute and a second sub flow of particles flows through the second outlet chute.

On the other hand, when it is desired that the whole particle flow is directed to the first outlet chute, the particle flow through the second outlet chute can be prevented by keeping the fluidization of the horizontal intermediate pipe and the gas flow to the vertical riser pipe at a low enough level. Then, all solid particles flowing downwards in the vertical inlet pipe continue to the first outlet chute and, for example, via the first outlet chute, to a heat exchanger. Because the branch leading to the first outlet chute is connected to the vertical inlet pipe at a level higher than the bottom of the vertical inlet pipe, and the horizontally extending intermediate pipe, directing the particle flow through the first outlet chute does not require using any such fluidization in the system, which would otherwise cause an unwanted flow of particles through the second outlet chute.

The invention is specifically directed to applications in which, from the initial flow of particles is formed a first sub flow, which can be called main sub flow, and a second sub flow, which second sub flow is in normal operating conditions less than the first sub flow. The ratio of the first and second sub flows is, however, advantageously controllable to any value, from 1:0 to 0:1. Thus, according to the present invention, it is advantageously possible to direct the initial flow of particles through any of the first and second outlet chutes, or to split the initial flow between the first and second sub flows in any desired ratio.

In order to achieve desired controllability of the flow ratio of the first and second sub flows to the first and second outlet chutes, the level L1 is preferably at least 0.3 meters higher, even more preferably at least 0.5 meters higher than the level L0. Correspondingly, the level L2 that is preferably at least 0.2 meters higher, even more preferably at least 0.4 meters higher than the level L1. Thus, the arrangement for controlling flow of solid particles according to the present invention enables versatile control, by a non-mechanical control device, of the ratio of first and second sub flows formed from the initial flow of solid particles. In embodiments comprising a branch with a weir extending to a level L3 in the flow path to the first outlet chute, the level L2 is advantageously at least 0.1 meters higher than the level L3.

According to a preferred embodiment of the present invention, the second outlet chute is directed vertically downwards at the side of the vertically extending riser pipe at the upper end thereof, at the level L2. Alternatively, the upper portion of the second outlet chute may be slanted so as to form an angle from ten to sixty degrees with the vertical direction, or the direction of the vertically extending riser pipe. Correspondingly, the upper portion of the first outlet chute may be directed vertically downwards or it may be slanted from the vertical direction so as to form an angle from ten to sixty degrees with the vertical direction.

Above are described embodiments in which a first sub flow and a second sub flow are formed from the initial flow of solid particles. According to a variant of the present invention, the second sub flow may be divided into further sub flows, for example, by forming two, or even more than two, branches of a particle flow path comprising a horizontally extending intermediate pipe, a vertically extending riser pipe and an outlet chute, corresponding to distributing solid particles as shown in U.S. Pat. No. 4,733,621. According to a still further variant of the present invention, the first sub flow may be divided into further sub flows, for example, by forming two, or even more than two, horizontally extending shift pipes from an opening on a side wall of the vertical inlet pipe to an intermediate riser pipe, as described above.

The present invention also provides a fluidized bed reactor comprising a particle separator for separating solid particles from exhaust gas emanating from the reactor and a return duct system for returning separated particles from the particle separator back to the reactor, the return duct system comprising an inlet duct, a first return path for returning separated solid particles back to the reactor, the first return path comprising a heat exchange chamber for recovering heat from the separated solid particles, and a second return path for returning separated solid particles directly to the reactor, wherein the return duct system comprises an arrangement for controlling flow of solid particles as defined in any of the embodiments described above, wherein the inlet duct forms the vertical inlet pipe, the first return path comprises the first outlet chute, and the second return path comprises the second outlet chute.

The above brief description, as well as further objects, features, and advantages of the present invention will be more fully appreciated by reference to the following detailed description of the currently preferred, but, nonetheless illustrative, embodiments in accordance with the present invention, when taken in conjunction with the accompanying drawings.

DETAILED DESCRIPTION OF THE INVENTION

Figure 1:
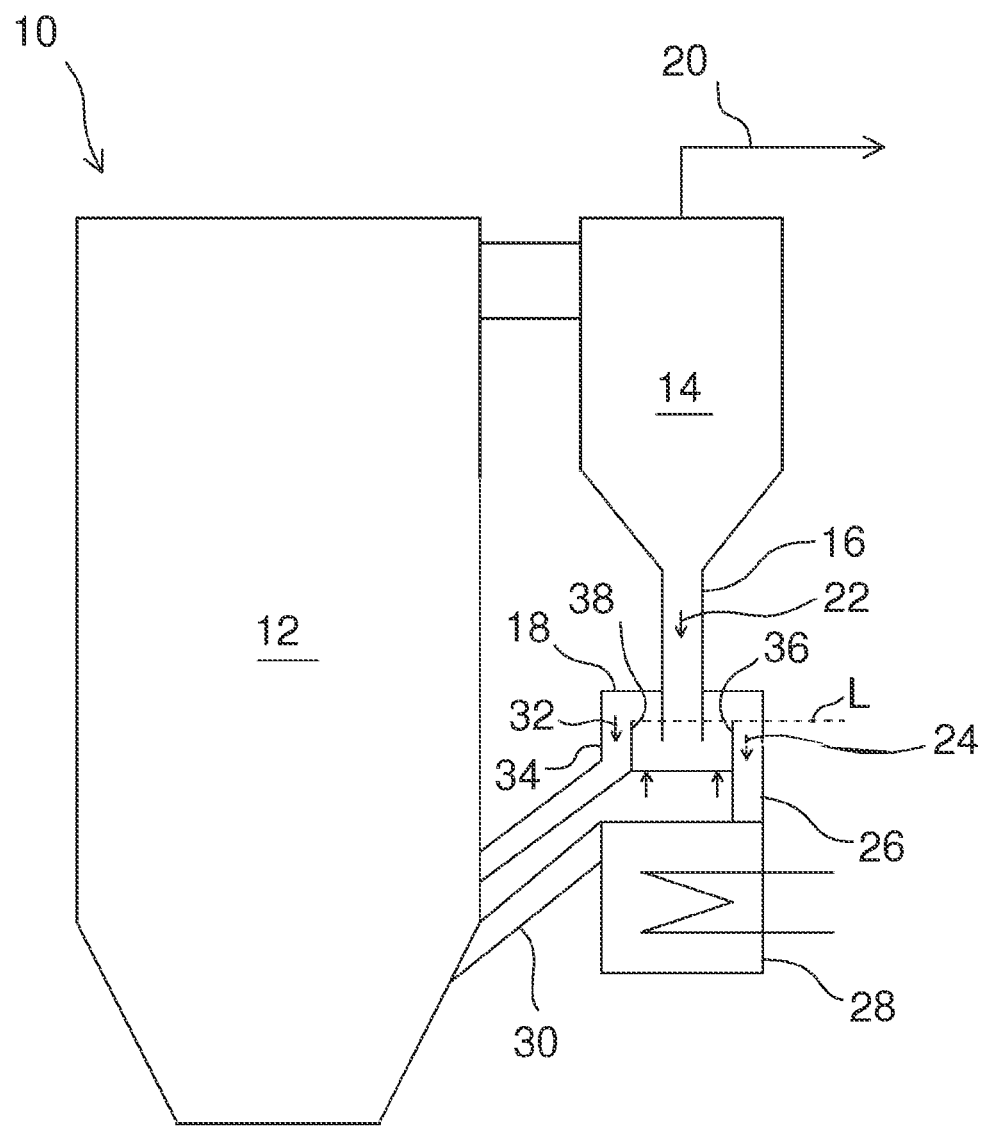
FIG. 1 schematically illustrates a circulating fluidized bed (CFB) boiler with a conventional arrangement for controlling solids flow.

The diagram of FIG. 1 schematically illustrates a conventional circulating fluidized bed (CFB) boiler construction 10, comprising a furnace 12 and a particle separator 14 for separating solid particles from the exhaust gas emanating from the furnace 12. Separated particles are conveyed from the particle separator 14 via a vertical inlet pipe 16 to a flow dividing chamber 18, and cleaned exhaust gas is discharged from the particle separator 14 through an exhaust gas channel 20 via conventional heat recovery and gas cleaning stages and a stack to the environment. The furnace 12 also comprises conventional means relating to, for example, feeding of fuel and combustion air to the furnace and discharging ash from the furnace. Since such means are, however, not important for the understanding of the present invention they are omitted from FIG. 1.

The initial flow of separated particles 22 falling downwards in the vertical inlet pipe 16 is divided in the flow dividing chamber 18 to two sub flows. One of the sub flows, a so-called first sub flow 24, flows via a first outlet chute 26 to a heat exchanger 28, from where a flow of cooled particles is returned to the furnace 12 via a return duct 30. Another sub flow, a so-called second sub flow 32, flows from the flow dividing chamber 18 via a second outlet chute 34 directly to the furnace 12.

The conventional flow dividing chamber 18 comprises a flat bottom with at least two separately fluidized areas and two weirs 36, 38 over which the first and second sub flows can be guided to the first and second outlet chutes 26, 34, respectively. The weirs extend to a common level L and cause a bed of separated particles, extending from the bottom of the flow dividing chamber to the level L, being formed to the flow dividing chamber. The lower end of the vertical inlet pipe 16 is at a level lower than L, and, thus, in operation within a bed of particles, whereby the bed acts as a gas seal that seal prevents fluidizing gas from flowing or escaping from the furnace 12 or from the heat exchanger 28 backwards via the vertical inlet pipe 16 to the particle separator 14.

The purpose of the flow dividing chamber 18 is to enable controlling the ratio of the two sub flows 24 and 32. When fluidizing gas is injected adjacent the weir 36 of the first outlet chute 26, the first sub flow 24 is increased, and vice versa. The inventors of the present invention have noticed that the controllability of the conventional flow dividing chamber shown in FIG. 1 is, however, not very good, but the fluidizing gas has a tendency to spread throughout the bed in the flow dividing chamber 18, and a considerable amount of particles flow to both outlet chutes, in spite of the attempt to control the flows separately.

Figure 2A:
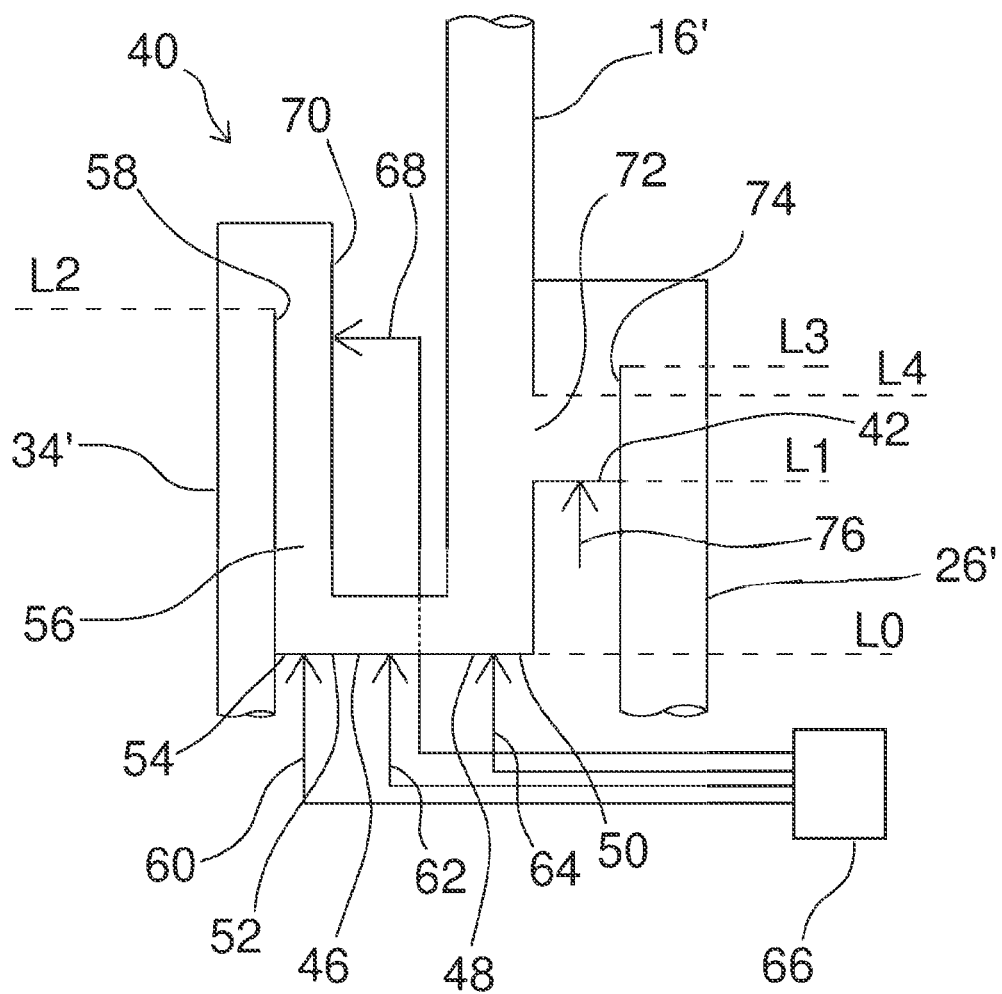
FIGS. 2a, 2b and 2c schematically illustrate variants of an arrangement for controlling solids flow according to a first preferred embodiment of the present invention.

The diagram of FIG. 2a schematically illustrates a flow controlling arrangement 40 according to a preferred embodiment of the present invention. The flow controlling arrangement 40 corresponds in many respects to the conventional flow dividing chamber 18 shown in FIG. 1 and could be arranged to replace it in connection with a CFB boiler. The elements in FIG. 2a that directly correspond to similar elements in FIG. 1 are shown with the same reference number as in FIG. 1, but with an apostrophe. Thus, the flow controlling arrangement 40 of FIG. 2 comprises a vertical inlet pipe 16' and first and second outlet chutes 26' and 34', respectively.

A main feature of the flow controlling arrangement shown in FIG. 2a is that it comprises a branch 42 diverging from the vertical inlet pipe 16' to the first outlet chute 26' at a level L1, that is higher than the level L0 of the bottom of the vertical inlet pipe 16'. More specifically, the level L1 corresponds to the level of the bottom of the branch 42. In the embodiment shown in FIG. 2 the branch 42 is connected to an opening 72, having a lower edge at the level L1, on a side wall of the vertical inlet pipe 16'. The branch 42 advantageously comprises a weir 74 over which solid particles must flow to enter to the first outlet chute 26'. The weir 74 extends to a level L3 that is higher than level L4 of the upper edge of the opening 72. Therefore, when solid particles flow to the first outlet chute 26', a gas lock forming bed of particles is collected to the branch 42. To assist the flow of particles to the first outlet chute 26', the bed of particles is advantageously fluidized by a fluidization nozzle 76.

The flow controlling arrangement 40 also comprises a horizontally extending pipe, a so-called horizontally extending intermediate pipe 46, connected to the bottom 50 of the vertical inlet pipe 16' at the level L0. Thereby, the horizontally extending intermediate pipe 46 comprises a first end 48 attached in particle flow connection with the bottom 50 of the vertical inlet pipe 16'. A second end 52 of the horizontally extending intermediate pipe 46 is attached in particle flow connection with a bottom end 54 of a vertically extending riser pipe 56. A bed of particles collecting in operation to the horizontally extending intermediate pipe 46, and to the vertically extending riser pipe 56, forms a gas lock for the second outlet chute 34', i.e., it prevents gas flow backwards through the second outlet chute to the vertical inlet pipe 16'.

An upper end 70 of the vertically extending riser pipe 56 is in particle flow connection with a second outlet chute 34' over an upper edge of a side wall portion of the vertically extending riser pipe 56, forming a second weir 58 to the particle flow at a level L2. The upper level L2 of the second weir is preferably higher than L3, the upper level of the first weir 74 in the branch 42.

At the horizontally extending intermediate pipe 46, usually, at the bottom thereof, are arranged means, usually nozzles 60, 62, 64, connected to a fluidizing gas providing source 66, such as a divided wind box, to provide fluidizing gas, usually air, at suitable pressures to the nozzles. The nozzles enable controlled fluidization of bed material in the different portions of the horizontally extending intermediate pipe 46 by the fluidizing gas, by selected fluidizing velocities. Such fluidizing nozzles are advantageously arranged at one or more of the first end 48, the second end 54 and a central portion of the horizontally extending intermediate pipe 46. Corresponding fluidizing nozzles 68 can also be arranged at a side wall of the vertically extending intermediate riser pipe 56.

The flow controlling arrangement according to FIG. 2a is operated so that when it is desired that the whole initial particle flow is directed to the first outlet chute 26', the fluidizing velocity in the horizontally extending intermediate pipe 46 and/or in the vertically extending riser pipe 56 is kept at such a low level, that the top level of particle bed in the vertically extending riser pipe 56 remains below the level L2. Thereby, no particle flow is directed to the second outlet chute 34' and all the initial particle flow in the vertical inlet pipe 16' is directed to the first outlet chute 26'.

When it is desired that a portion of the initial particle flow is directed to the second outlet chute 34', the fluidizing velocity in the horizontally extending intermediate pipe 46 and/or the vertically extending riser pipe 56 is increased to such a high level, that the top level of particle bed in the vertically extending intermediate riser pipe 56 rises to the level L2. Thereby, a portion, the size of which depends on the fluidizing velocity in the horizontally extending intermediate pipe 46 and/or the vertically extending riser pipe 56, of the solid particles flows to the second outlet chute 34'.

When the flow controlling arrangement is designed so that the level L3 of the first weir is lower than but relatively close to, the level L2 of the second weir, say, their distance is preferably at most about 0.3 meters, even more preferably at most 0.2 meters, it is even possible to increase the fluidizing velocity in the vertically extending riser pipe 56 so high that the top level of the fluidized bed in the vertical inlet pipe 16' and, especially, in the branch 42 remains below L3, and all the initial particle flow in the vertical inlet pipe 16' is directed to the second outlet chute 34'.

The advantageousness of the flow controlling arrangement 40 shown in FIG. 2a is based on the fact that, because the beginnings of the first and second outlet chutes 26', 34', i.e., the points of turning downwards of the respective particle flow paths, are both horizontally and vertically separated from each other, the particle flows to the first and second outlet chutes can be independently controlled.

Because the branch 42 to the first outlet chute 26' is at a higher level than the level L0 of the bottom of the riser pipe 56, an independently controlled flow of particles can be guided to the first outlet chute 26'. Moreover, even if it is necessary to maintain some fluidization at the bottom 50 of the vertical inlet pipe 16', this fluidization does not give rise to particle flow upwards in the riser piper 56 because the riser pipe is by the horizontally extending intermediate pipe 46 separated from the vertical inlet pipe 16'. In order to provide the desired controllability, the horizontally extending intermediate pipe 46 has to have a minimum length with respects to its height. The length of the horizontally extending intermediate pipe is preferably at least 1.5 times its height, even more preferably at least two times its height.

Figure 2B:
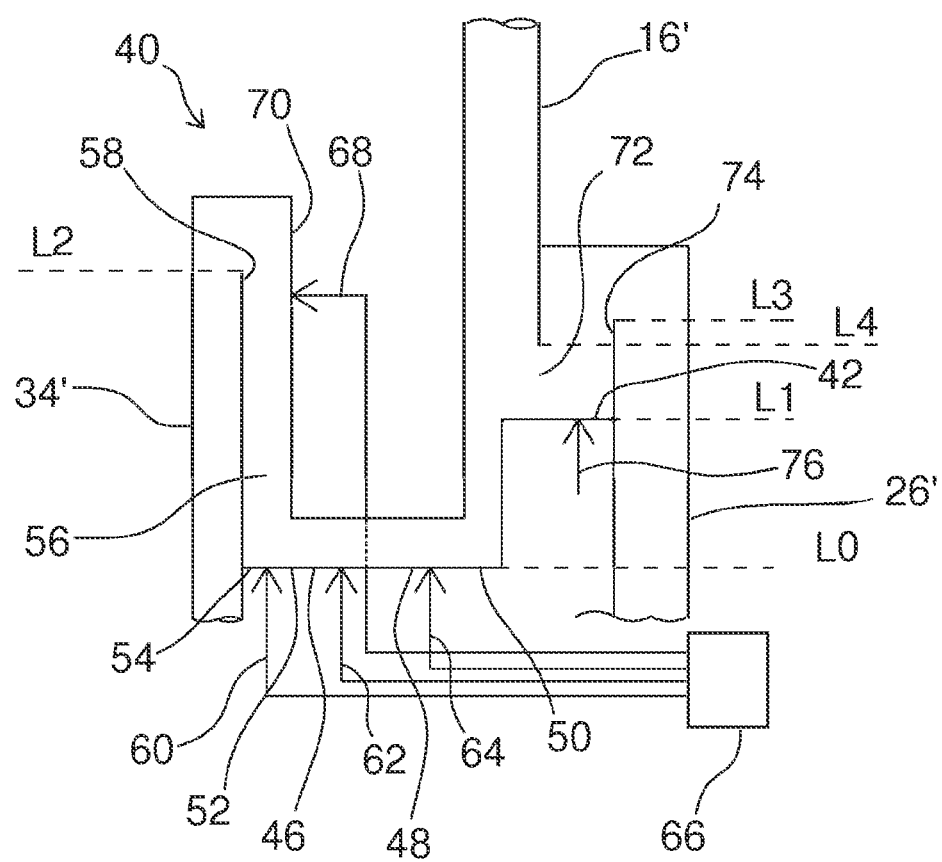
Figure 2C:
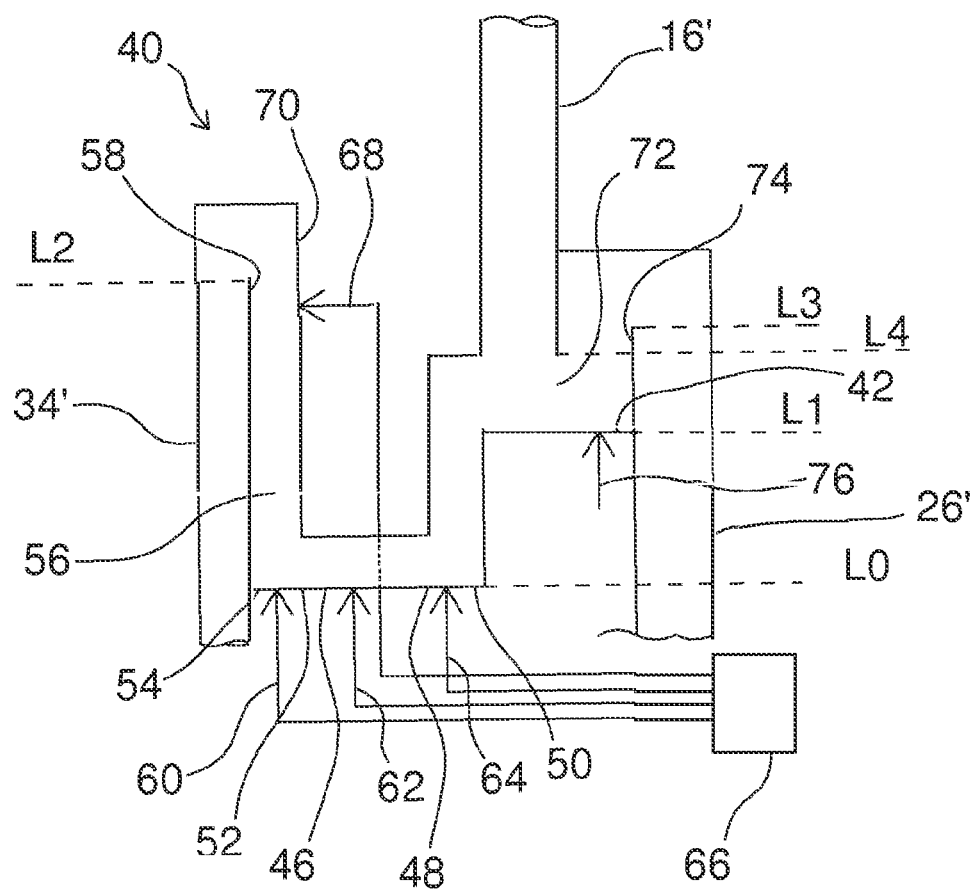

In the embodiment shown in FIG. 2a, the vertical inlet pipe 16' is a simple straight tube all the way to the bottom 50. However, FIGS. 2b and 2c show two other variants, in which the vertical inlet pipe 16' comprises a lower portion, and a bottom 50, with an axis or cross section that is partly or completely offset from that of the upper portion. Making such an offset at the level L1 of the lower edge of the opening 72 may make it easier to provide a reliable gas lock in the branch 42.

Figure 3:
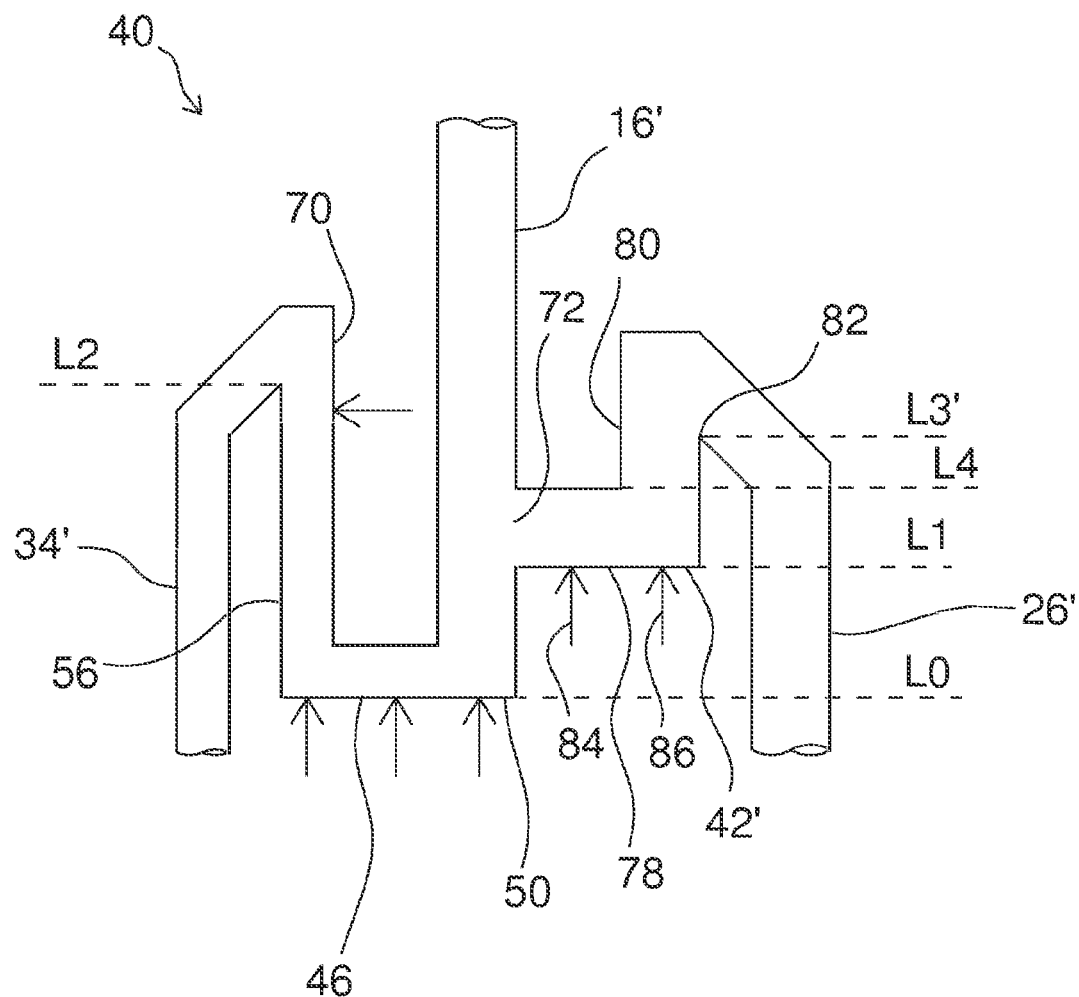
FIG. 3 schematically illustrates an arrangement for controlling solids flow according to a second preferred embodiment of the present invention.

The embodiment shown in FIG. 3 differs from that shown in FIG. 2a mainly in that the branch 42' from the opening 72 on a side wall of the vertical inlet pipe 16' comprises a horizontally extending shift pipe 78 to an intermediate riser pipe 80. The upper end of the intermediate riser pipe 80 is then in particle flow connection with the first outlet chute 26' over an upper edge of a side wall portion of the intermediate riser pipe 80, forming a weir 82 to the particle flow at a level L3'. When solid particles flow over the weir 82 to the first outlet chute 26', a gas lock forming bed of particles is collected to the horizontally extending intermediate pipe 78 and to the intermediate riser pipe 80. Fluidizing nozzles 84, 86 are advantageously arranged in the horizontally extending shift pipe 78 and below or on the side wall of the intermediate riser pipe 80 to enable exact control of the flow of particles to the first outlet chute 26'.

Figure 4:
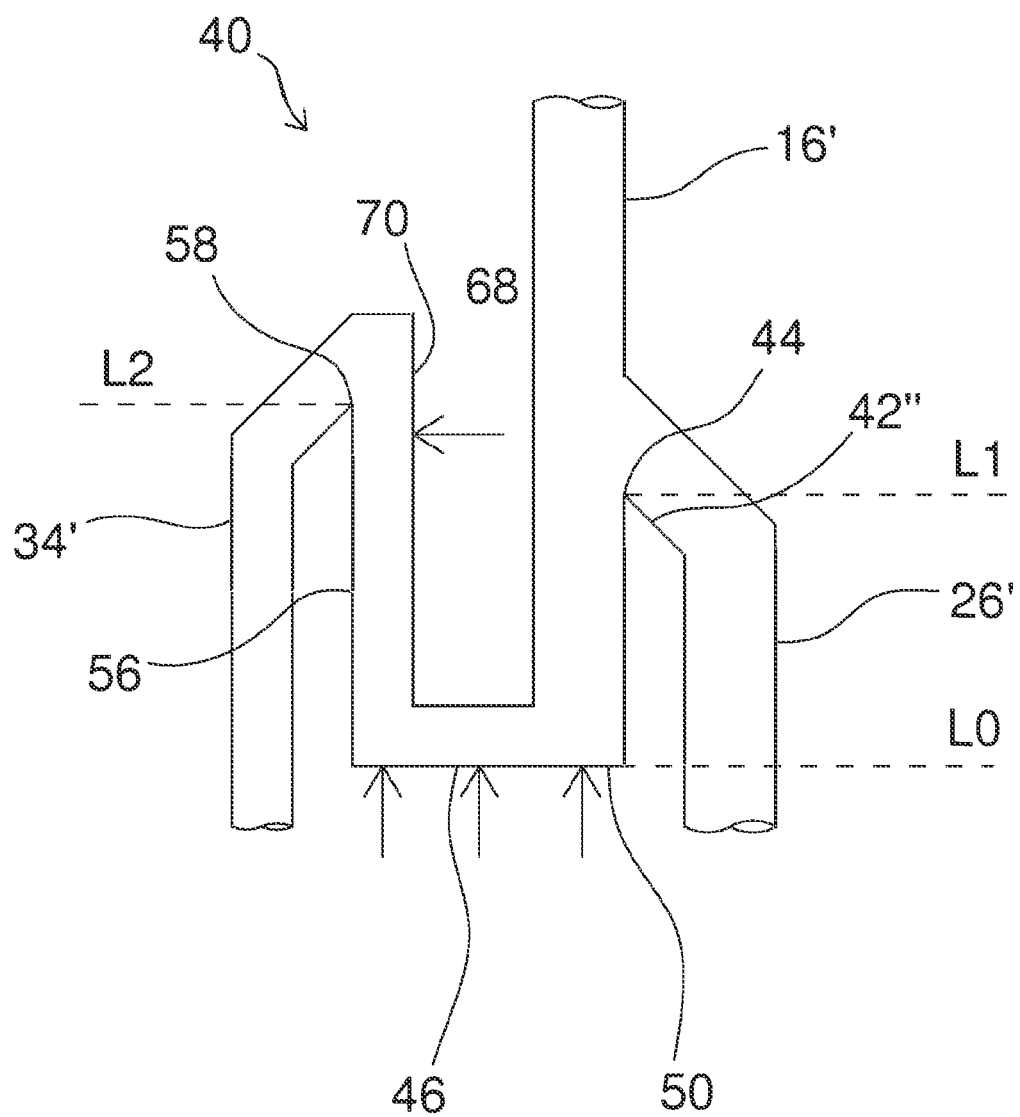
FIG. 4 schematically illustrates an arrangement for controlling solids flow according to a third preferred embodiment of the present invention.

FIG. 4 shows an embodiment of the present invention, in which the flow controlling arrangement 40 comprises a downwardly slanted branch 42" directly from an opening with a lower edge at the level L1 on a side wall of the vertical inlet pipe 16' to the first outlet chute 26'. Thus, first outlet chute 26' begins already as the downwardly slanted branch 42", and there is no gas lock forming weir in the branch 42". The level L1 is higher, preferably at least 0.3 meters higher, even more preferably at least 0.5 meters higher, than the level L0 of a bottom 50 of the vertical inlet pipe 16'.

Similarly, as in the embodiments shown in FIGS. 2a, 2b, 2c and 3, the embodiment shown in FIG. 4 comprises a horizontally extending intermediate pipe 46 having a first end attached in particle flow connection with the bottom 50 of the vertical inlet pipe 16' and a second end attached in particle flow connection with a bottom end of a vertically extending riser pipe 56. When fluidizing gas is fed at a low enough rate to the horizontally extending intermediate pipe 46 and to the vertically extending riser pipe 56, a bed of particles extending up to the level L1 is formed to the bottom 50 of the vertical inlet pipe 16'. Additional solid particles can then freely flow to the first outlet chute 26', and solid particles are entering through the vertical inlet pipe 16' primarily flow to the first outlet chute 26'.

The second outlet chute 34' is connected at the top end of the vertically extending riser pipe 56, at the level L2. In order to enable the above described flow of most of the particles to the first outlet chute 26', the level L2 is in this embodiment advantageously at least 0.1 meters higher than the level L1. On the other hand, the level L2 is herein preferably at most about 0.3 meters higher, even more preferably at most 0.2 meters higher, than the level L1. Thereby, the share of particles flowing to the second outlet chute 34' can be efficiently increased by increasing the fluidization of the horizontally extending intermediate pipe 46 and/or the vertically extending riser pipe 56.

In this embodiment, the particle flow path to the first outlet chute 26' does not form a gas lock. The embodiment is, therefore, only usable in applications in which a gas lock is not needed or a gas lock is provided in another part of the particle flow path, for example, in a heat exchange chamber downstream of the flow controlling arrangement.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

The invention claimed is:

1. An arrangement for controlling a flow of solid particles, the arrangement comprising:
    a vertical inlet pipe for directing the flow of solid particles downwards therein and having a bottom at a level L0;
    a first outlet chute and a second outlet chute in particle flow connection with the vertical inlet pipe;
    a fluidizing device for directing controlled first and second sub flows formed from the flow of solid particles to the first and second outlet chutes, respectively;
    a branch in particle flow connection with an opening on a side wall of the vertical inlet pipe for directing the first sub flow of solid particles to the first outlet chute, wherein the opening has a lower edge at a level L1 that is higher than L0, and the branch comprises a weir over which solid particles must flow to enter the first outlet chute;
    a horizontally extending intermediate pipe for directing the second sub flow of solid particles to the second outlet chute, the horizontally extending intermediate pipe comprising at least one nozzle for feeding fluidizing gas to the horizontally extending intermediate pipe and having a first end in particle flow connection with the bottom of the vertical inlet pipe at the level L0; and
    a vertically extending riser pipe with a bottom end in particle flow connection with a second end of the horizontally extending intermediate pipe, an upper end of the vertically extending riser pipe being in particle flow connection with the second outlet chute at a level L2 that is higher than L1.

2. The arrangement for controlling flow of solid particles in accordance with claim 1, wherein the at least one nozzle for feeding fluidizing gas comprises a nozzle for feeding fluidizing gas in at least one of the second end of the horizontally extending intermediate pipe, between the first end and the second end of the horizontally extending intermediate pipe, and the first end of the horizontally extending intermediate pipe.

3. The arrangement for controlling flow of solid particles in accordance with claim 2, wherein the horizontally extending intermediate pipe has a height, and a length that is at least 1.5 times the height.

4. The arrangement for controlling flow of solid particles in accordance with claim 2, wherein the vertically extending riser pipe comprises at least one nozzle for feeding fluidizing gas at a level between L0 and L2.

5. The arrangement for controlling flow of solid particles solid particles in accordance with claim 1, when the level L1 is at least 0.3 meters higher than the level L0.

6. The arrangement for controlling flow of solid particles in accordance with claim 1, wherein the level L2 is at least 0.2 meters higher than the level L1.

7. The arrangement for controlling flow of solid particles solid particles in accordance with claim 1, wherein the branch comprises at least one nozzle for feeding fluidizing gas.

8. The arrangement for controlling flow of solid particles solid particles in accordance with claim 1, wherein the opening has an upper edge at a level L4 and the weir extends to a level L3 that is higher than the level L4, so as to collect a gas lock forming bed of particles in the branch.

9. The arrangement for controlling flow of solid particles solid particles in accordance with claim 8, wherein the level L2 is higher than the level L3.

10. The arrangement for controlling flow of solid particles solid particles in accordance with claim 9, wherein the level L2 is at most 0.2 meters higher than the level L3.

11. The arrangement for controlling flow of solid particles solid particles in accordance with claim 1, wherein the branch comprises a horizontally extending shift pipe from the opening to an intermediate riser pipe, and wherein a portion of a side wall of the intermediate riser pipe forms the weir.

12. A fluidized bed reactor comprising:
    a particle separator for separating solid particles from exhaust gas emanating from the reactor; and
    a return duct system for returning separated particles from the particle separator back to the reactor, the return duct system comprising an inlet duct, a first return path for returning separated solid particles back to the reactor, the first return path comprising a heat exchange chamber for recovering heat from the separated solid particles, and a second return path for returning separated solid particles directly to the reactor, and an arrangement for controlling flow of solid particles according to claim 1, wherein the inlet duct forms the vertical inlet pipe, the first return path comprises the first outlet chute and the second return path comprises the second outlet chute.

13. A method of controlling a flow of solid particles, the method comprising:

directing an initial flow of solid particles downwards in a vertical inlet pipe having a bottom at a level L0;

forming controlled first and second sub flows of solid particles from the initial flow of solid particles and leading the first and second sub flows to first and second outlet chutes, respectively;

forming a fluidized bed of solid particles from the initial flow of solid particles to a horizontally extending intermediate pipe extending from the bottom of the vertical inlet pipe at the level L0 to a bottom end of a vertically extending riser pipe;

leading the first controlled sub flow to the first outlet chute via a branch from an opening on a side wall of the vertical inlet pipe at a level L1 that is higher than L0, wherein the branch comprises a weir over which solid particles must flow to enter to the first outlet chute; and leading the second controlled sub flow from an upper end of the vertical riser pipe to the second outlet chute at a level L2 that is higher than L1.

14. The method of controlling a flow of solid particles in accordance with claim 13, further comprising that, when it is desired that the entirety of the initial flow of solid particles be directed to the first outlet chute, the fluidizing velocity in at least one of the horizontally extending intermediate pipe and in the vertically extending riser pipe is kept at such a low level that the top level of particle bed in the vertically extending riser pipe remains below level L2.

15. The method of controlling a flow of solid particles in accordance with claim 14, further comprising that, when it is desired that a portion of the initial flow of solid particles be directed to the second outlet chute, the fluidizing velocity in at least one of the horizontally extending intermediate pipe and the vertically extending riser pipe is increased to such a high level, that the top level of particle bed in the vertically extending riser pipe rises to the level L2.

16. The method of controlling a flow of solid particles in accordance with claim 13, wherein the vertical inlet pipe comprises an upper portion and a lower portion with a cross section that is at the level L1 partly or completely offset from that of the upper portion to provide a reliable gas lock in the branch.

\* \* \* \* \*